(12) United States Patent
Morgan et al.

(10) Patent No.: US 10,829,678 B2
(45) Date of Patent: Nov. 10, 2020

(54) TREATMENT FLUIDS COMPRISING CALCIUM ALUMINATE CEMENT AND METHODS OF USE

(71) Applicant: Halliburton Energy Services, Inc., Houston, TX (US)

(72) Inventors: Ronnie Glen Morgan, Waurika, OK (US); Kyriacos Agapiou, Houston, TX (US); Samuel J. Lewis, Spring, TX (US); Thomas Jason Pisklak, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/282,010

(22) Filed: Feb. 21, 2019

(65) Prior Publication Data

US 2019/0185729 A1  Jun. 20, 2019

Related U.S. Application Data

(62) Division of application No. 15/518,442, filed as application No. PCT/US2014/068817 on Dec. 5, 2014, now Pat. No. 10,253,235.

(51) Int. Cl.
*C09K 8/04* (2006.01)
*C09K 8/05* (2006.01)
(Continued)

(52) U.S. Cl.
CPC ............ *C09K 8/032* (2013.01); *C04B 22/062* (2013.01); *C04B 22/10* (2013.01); *C04B 22/147* (2013.01);
(Continued)

(58) Field of Classification Search
None
See application file for complete search history.

(56) References Cited

U.S. PATENT DOCUMENTS

| | | | |
|---|---|---|---|
| 3,817,770 | A | 6/1974 | Dunworth et al. |
| 4,455,171 | A | 6/1984 | Spensley et al. |

(Continued)

FOREIGN PATENT DOCUMENTS

| | | |
|---|---|---|
| GB | 2544220 | 5/2017 |
| WO | 2009018448 | 2/2009 |
| WO | 2014004943 | 1/2014 |

OTHER PUBLICATIONS

Kerneos technical paper "Calcium Aluminate Mineral Suspensions, an Innovative Liquid Binder for Construction and Coating Industries", by Pascal Taquet dated Mar. 21, 2013.

(Continued)

*Primary Examiner* — William D Hutton, Jr.
*Assistant Examiner* — Charles R Nold
(74) *Attorney, Agent, or Firm* — Thomas Rooney; C. Tumey Law Group PLLC

(57) ABSTRACT

Methods and systems for the treatment of wells are disclosed. A method for treating a well comprises providing a treatment fluid comprising calcium-aluminate cement, water, and a cement set retarder; and introducing the treatment fluid into a wellbore. A system for treating a well comprises a treatment fluid comprising calcium-aluminate cement, water, and a cement set retarder; a vessel to contain the treatment fluid; a pumping system coupled to the vessel to pump the treatment fluid; and a conduit coupled to the pumping system.

19 Claims, 7 Drawing Sheets

(51) Int. Cl.

| | | |
|---|---|---|
| C09K 8/58 | (2006.01) | |
| E21B 21/00 | (2006.01) | |
| E21B 33/13 | (2006.01) | |
| C04B 22/10 | (2006.01) | |
| C04B 28/06 | (2006.01) | |
| C09K 8/03 | (2006.01) | |
| C09K 8/42 | (2006.01) | |
| C09K 8/467 | (2006.01) | |
| E21B 33/14 | (2006.01) | |
| C04B 22/06 | (2006.01) | |
| C04B 22/14 | (2006.01) | |
| C04B 103/12 | (2006.01) | |
| C04B 103/22 | (2006.01) | |
| C04B 111/00 | (2006.01) | |

(52) U.S. Cl.
CPC ............... *C04B 28/06* (2013.01); *C09K 8/04* (2013.01); *C09K 8/05* (2013.01); *C09K 8/424* (2013.01); *C09K 8/467* (2013.01); *C09K 8/58* (2013.01); *E21B 21/00* (2013.01); *E21B 33/13* (2013.01); *E21B 33/14* (2013.01); *C04B 2103/12* (2013.01); *C04B 2103/22* (2013.01); *C04B 2111/00706* (2013.01); *C09K 2208/02* (2013.01)

(56) References Cited

U.S. PATENT DOCUMENTS

| | | |
|---|---|---|
| 6,457,529 B2 | 10/2002 | Calder et al. |
| 7,284,608 B2 | 10/2007 | Reddy et al. |
| 7,395,878 B2 | 7/2008 | Reitsma et al. |
| 2008/0066655 A1 | 3/2008 | Fraser |
| 2009/0095482 A1 | 4/2009 | Surjaatmadja |
| 2010/0175589 A1 | 7/2010 | Charpentier et al. |
| 2010/0186955 A1 | 7/2010 | Saasen et al. |
| 2010/0240556 A1* | 9/2010 | Keys ................. C09K 8/426 507/260 |
| 2012/0145044 A1 | 6/2012 | Mills et al. |
| 2014/0305662 A1 | 10/2014 | Giroux et al. |
| 2015/0274959 A1 | 10/2015 | Kim-Habermehl et al. |

OTHER PUBLICATIONS

Kerneos technical paper, "Peramin AXL 80, a new selling accelerator upon Lithium Sulphate technology for Calcium Aluminates based materials", by Severine Favier dated Mar. 19, 2013.

International Search Report and Written Opinion for Application No. PCT/US14/68817 dated Aug. 3, 2015.

Great Britain Examination Report and Search Report for Application No. GB1702994.3 dated Sep. 25, 2018.

Canadian Office Action for Application No. 2,959,125 dated Jan. 19, 2018.

Notice of Allowance for Application No. 151518,442 dated Nov. 28, 2018.

Office Action for U.S. Appl. No. 15/518,442 dated Feb. 6, 2018.

Final Office Action for U.S. Appl. No. 15/518,442 dated Aug. 8, 2018.

\* cited by examiner

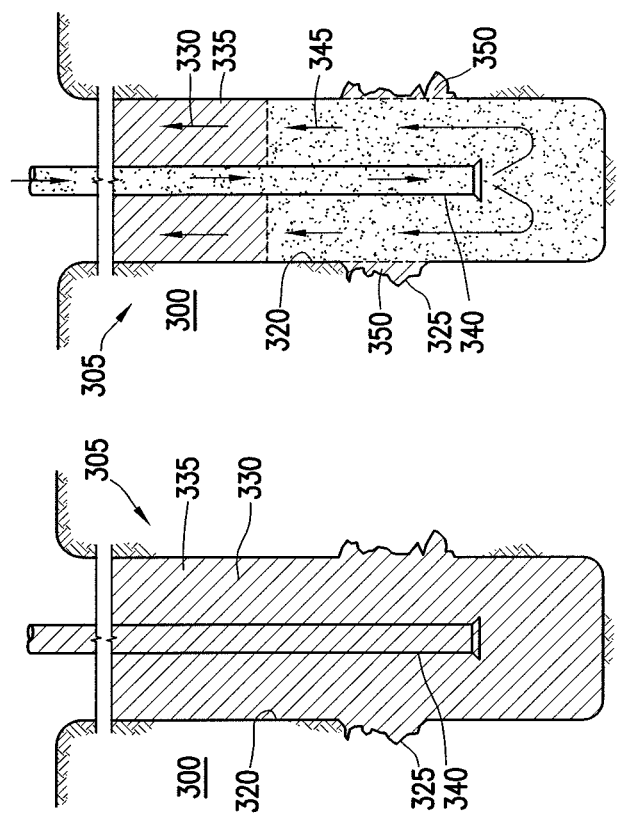
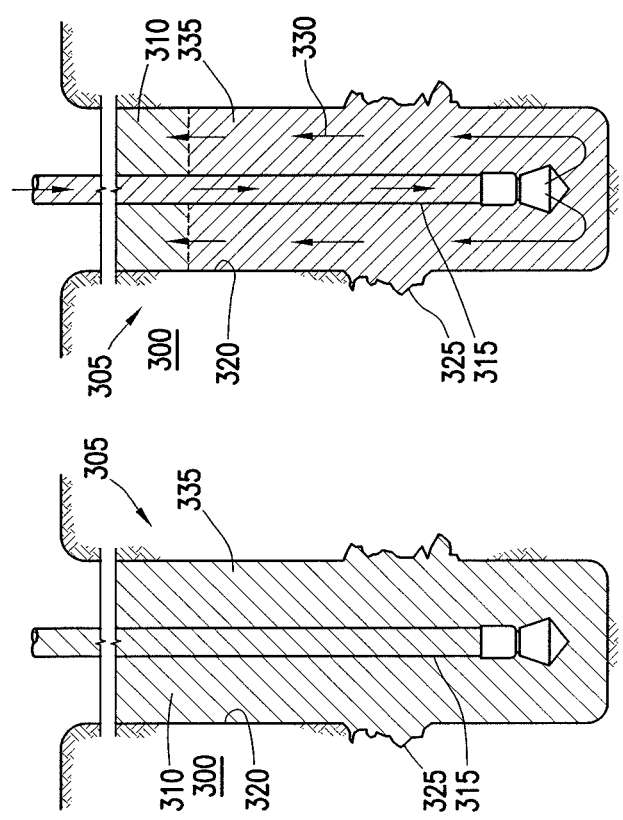

TREATMENT FLUIDS COMPRISING CALCIUM ALUMINATE CEMENT AND METHODS OF USE

BACKGROUND

Methods of using treatment fluids and, more particularly, methods of using treatment fluids comprising calcium aluminate cement compositions in well operations are provided.

Cement compositions may be used in a variety of subterranean operations including operations that utilize treatment fluids. A broad variety of cement compositions have been used as treatment fluids. In some instances, extended-life cement compositions have been used. In contrast to conventional cement compositions that set and harden upon preparation, extended-life cement compositions are characterized by being capable of remaining in a pumpable fluid state for at least about one day (e.g., about 7 days, about 2 weeks, about 2 years or more) at room temperature (e.g., about 80° F.) in storage. When desired for use, the extended-life cement compositions should be capable of activation and consequently develop reasonable compressive strengths. For example, an extended-life cement composition that is activated may set into a hardened mass. Among other things, extended-life cement compositions may be suitable for use in treatment fluids where it is desirable to prepare the treatment fluid in advance. This may allow the treatment fluid to be stored prior to use. In addition, this may allow the treatment fluid to be prepared at a convenient location before transportation to the job site. Accordingly, capital expenditures may be reduced due to a reduction in the need for on-site bulk storage and mixing equipment. This may be particularly useful for offshore operations where space onboard the vessels may be limited.

Drilling and fluid displacement are two subterranean operations that utilize treatment fluids. Drilling requires the use of drilling fluid or as it is also known, drilling mud. Drilling fluids may be used to maintain hydrostatic pressure in the wellbore, prevent formation damage, suspend cuttings, and to transport cuttings to the surface. Drilling fluids may be water-based or oil-based. Typical water-based drilling fluids may be composed of solely water or a mixture of water and various types of clay. Oil based drilling fluids typically use a base fluid of a petroleum product.

Fluid displacement utilizes one or more fluids to displace another fluid from the wellbore. Typically this may be done to prevent contamination of one fluid with another or the contamination of one fluid with the formation. A displacement fluid or as it is also known, a spacer fluid, may be water-based fluids. In most instances, spacer fluids may be used to separate drilling fluid from a cement composition during a cementing operation. Because the spacer fluid will be used to separate two other fluids, such as the drilling fluid and the cement composition, the spacer fluid should be compatible with both treatment fluids.

Spotting fluids may be used to remove drilling fluid and prevent the drilling fluid filter cake from interfering with subsequent primary cementing operations, this may be a potential problem where differential sticking stops a drill pipe. A spofting fluid may be used to at least partially displacing the drilling fluid before the drilling fluid in the wellbore has had a chance to gain significant gel strength, for example, prior to introducing the pipe string into the well bore. Generally, these spotting fluids should not have an undesirable increase in gel strength after being static in the wellbore for a period of time, for example, up to at least two weeks, so that the spotting fluids may be displaced from the wellbore. After the wellbore is at least partially filled with a spotting fluid, the pipe string to be cemented may be introduced into the wellbore. When the cement composition is pumped through the pipe string into the annulus, the drilling fluid (if any) and the spotting fluid in the pipe string and annulus may be displaced ahead of the cement composition.

Switching between treatment fluids in a subterranean operation can be costly in both time and resources. Varied fluid types may require separate fluid storage, additional manpower, and additional equipment. In addition to the increased operating expenses, varied fluid use may create additional worksite problems such as higher environmental burdens, fluid incompatibilities, and the inability to reuse fluids and materials once their respective portion of the operation has been completed.

BRIEF DESCRIPTION OF THE DRAWINGS

These drawings illustrate certain aspects of some of the examples of the present method and should not be used to limit or define the method.

FIG. 5A illustrates a method for placement of a spotting fluid into a wellbore annulus in accordance with certain examples.

FIG. 5B illustrates a method for the placement of a spotting fluid into a wellbore annulus in accordance with certain examples.

FIG. 5C illustrates a method for the placement of a spotting fluid into a wellbore annulus in accordance with certain examples.

FIG. 5D illustrates a method for the placement of a spotting fluid into a wellbore annulus in accordance with certain examples.

DETAILED DESCRIPTION

Figure 1:
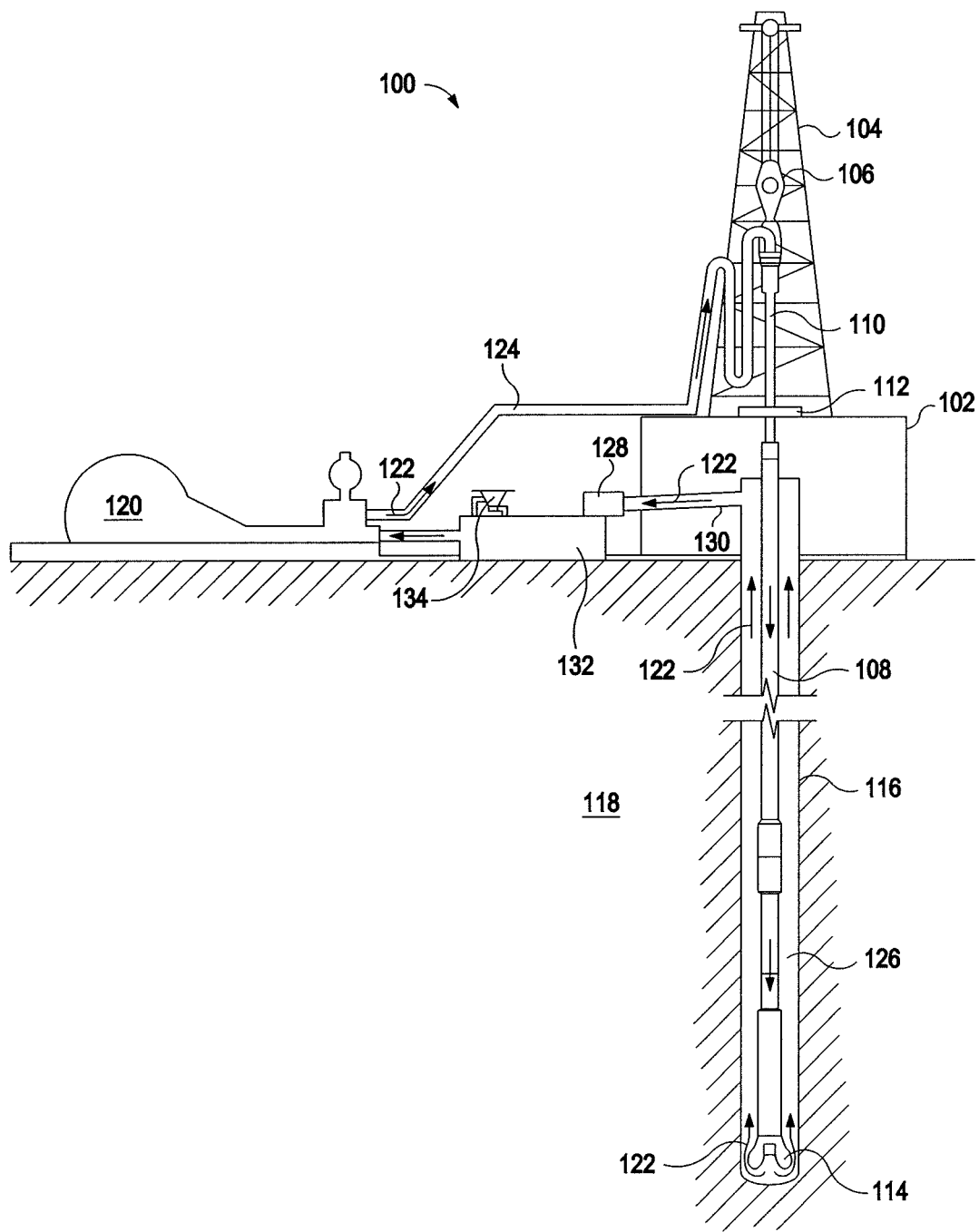
FIG. 1 illustrates a system for preparation and delivery of a drilling fluid to a wellbore in accordance with certain examples.

Methods of using treatment fluids and, more particularly, methods of using treatment fluids comprising calcium aluminate cement compositions in well operations are provided.

The treatment fluids may comprise calcium aluminate cement and water. Optionally, the treatment fluids may comprise a calcium-aluminate cement retarder, a cement-aluminate cement activator, a calcium-aluminate cement accelerator, and/or a dispersant. Advantageously, the treatment fluids may be capable of remaining in a pumpable fluid state for an extended period of time, i.e., they may be capable of remaining in a pumpable fluid state for at least about one day (e.g., about 7 days, about 2 weeks, about 2 years or more) at room temperature (e.g., about 80° F.) in storage. Generally, the treatment fluids may develop compressive strength after activation. Advantageously, the treatment fluids may develop reasonable compressive strengths at relatively low temperatures (e.g., temperatures of about 70° F. or less to about 140° F.). Thus, while the treatment fluids may be suitable for a number of subterranean cementing operations, they may be particularly suitable for use in subterranean formations having relatively low bottom hole static temperatures, e.g., temperatures of about 70° F. or less to about 140° F. Alternatively, the treatment fluids may be used in subterranean formations having bottom hole static temperatures up to 450° F. or higher.

The treatment fluids may comprise a calcium aluminate cement. Any calcium aluminate cement may be suitable for use. Calcium aluminate cements may be described as cements that comprise calcium aluminates in an amount greater than 50% by weight of the dry calcium aluminate cement (i.e., the calcium aluminate cement before water or any additives are added). A calcium aluminate may be defined as any calcium aluminate including, but not limited to, monocalcium aluminate, monocalcium dialuminate, tricalcium aluminate, dodecacalcium hepta-aluminate, monocalcium hexa-aluminate, dicalcium aluminate, pentacalcium trialuminate, tetracalcium trialuminate, and the like. Where present, the calcium-aluminate cement may be included in the treatment fluids in an amount in the range of from about 40% to about 70% by weight of the treatment fluids. For example, the calcium aluminate cement may be present in an amount ranging between any of and/or including any of about 40%, about 45%, about 50%, about 55%, about 60%, about 65%, or about 70% by weight of the treatment fluids. One of ordinary skill in the art, with the benefit of this disclosure, should recognize the appropriate amount of calcium-aluminate cement to include for a chosen application.

The treatment fluids may comprise water. The water may be from any source provided that it does not contain an excess of compounds that may undesirably affect other components in the treatment fluids, for example, it may be important that no compounds in the water raise the alkalinity of the treatment fluids unless it is desirable to do so. The water may comprise fresh water or salt water. Salt water generally may include one or more dissolved salts therein and may be saturated or unsaturated as desired for a particular application. Seawater or brines may be suitable for use in some applications. Further, the water may be present in an amount sufficient to form a pumpable fluid. In certain embodiments, the water may be present in the treatment fluids in an amount in the range of from about 33% to about 200% by weight of the cement (i.e., the weight of the calcium-aluminate cement). In certain embodiments, the water may be present in the treatment fluids in an amount in the range of from about 35% to about 70% by weight of the cement. With the benefit of this disclosure one of ordinary skill in the art should recognize the appropriate amount of water for a chosen application.

The treatment fluids may comprise a cement set retarder. Examples of the cement set retarder may include, but should not be limited, to hydroxycarboxylic acids such as citric, tartaric, gluconic acids or their respective salts, boric acid or its respective salt, and combinations thereof. A specific example of a suitable cement set retarder is Fe-2™ Iron Sequestering Agent available from Halliburton Energy Services, Inc., Houston, Tex. Generally, the cement set retarder may be present in the treatment fluids in an amount sufficient to delay the setting for a desired time. The cement set retarder may be present in the treatment fluids in an amount in the range of from about 0.01% to about 10% by weight of the cement (i.e., the calcium aluminate cement). More particularly, the cement set retarder may be present in an amount ranging between any of and/or including any of about 0.01%, about 0.1%, about 1%, about 2%, about 4%, about 6%, about 8%, or about 10% by weight of the cement. Additionally, it is important to use cement set retarders that do not undesirably affect the treatment fluids, for example, by increasing the pH of the treatment fluids unless desired. One of ordinary skill in the art, with the benefit of this disclosure, should recognize the appropriate amount of cement set retarder to include for a chosen application.

The treatment fluids may optionally comprise a cement set activator if it is desirable to induce setting of the treatment fluids. Certain cement set activators may additionally function as cement set accelerators and may accelerate the development of compressive strength in the treatment fluids in addition to activating the treatment fluids. A cement set activator may be any alkaline species that increases the pH of the treatment fluids sufficiently to initiate hydration reactions in the calcium aluminate cement, but also does not otherwise interfere with the setting of the calcium aluminate cement. Without being limited by theory, it is believed that activation may be induced due to the cement set activator removing the hydration barrier caused by the cement set retarders in the treatment fluids. Moreover, the large exotherm associated with the setting of the calcium-aluminate cement is believed to provide a large enough temperature increase that the treatment fluids may be able to set at temperatures much lower than other types of settable treatment fluids. Potential examples of cement set activators may include, but should not be limited to: Groups IA and IIA hydroxides such as lithium hydroxide, sodium hydroxide, magnesium hydroxide, and calcium hydroxide; alkaline aluminates such as sodium aluminate; Portland cement, the like, and combinations thereof. Some of the treatment fluids may benefit from the inclusion of two or more cement set activators or the combination of at least one cement set activator and at least one cement set accelerator, whereas other treatment fluids may only require one cement set activator. With the benefit of this disclosure, one having ordinary skill in the art will be able to select an appropriate cement set activator or combination of cement set activators for use with a chosen application.

The cement set activator may be present in the treatment fluids in an amount in the range of from about 0.01% to about 10% by weight of the cement (i.e., the calcium-aluminate cement). More particularly, the cement set activator may be present in an amount ranging between any of and/or including any of about 0.01%, about 0.1%, about 1%, about 2%, about 4%, about 6%, about 8%, or about 10% by weight of the cement.

As discussed above, the cement set activators may comprise calcium hydroxide which may be referred to as hydrated lime. As used herein, the term "hydrated lime" will be understood to mean calcium hydroxide. In some embodiments, the hydrated lime may be provided as quicklime (calcium oxide) which hydrates when mixed with water to form the hydrated lime. The hydrated lime may be included, for example, to activate the calcium aluminate cement.

As discussed above, the cement set activator may comprise a Portland cement. Examples of such Portland cements, include, but are not limited to, Classes A, C, H, or G cements according to the American Petroleum Institute, *API Specification for Materials and Testing for Well Cements*, API Specification 10, Fifth Ed., Jul. 1, 1990. In addition, the Portland cement may include Portland cements classified as ASTM Type I, II, III, IV, or V. For some examples using Portland cement as a cement set activator, it may be advantageous to also retard the Portland cement and/or activate a retarded Portland cement at various intervals during use of the methods disclosed herein. Any Portland cement set retarder and/or Portland cement set activator may be used in these instances provided that said Portland cement set retarders and/or Portland cement set activators do not undesirably interfere with the treatment fluids, for example, by prematurely increasing the pH of the treatment fluids.

The treatment fluids may optionally comprise a lithium salt which may function as cement set accelerator. A cement set accelerator may accelerate the development of compressive strength once the calcium aluminate cement has been activated, but the cement set accelerator, unless otherwise noted, does not itself induce activation of the calcium aluminate cement. Examples of suitable lithium salts include, without limitation, lithium sulfate and lithium carbonate. Without being limited by theory, it is believed that the lithium ions increase the number of nucleation sites for hydrate formation in the calcium aluminate cement. Thus, when the calcium aluminate cement is activated by combination with cement set activator, the presence of the lithium salts may accelerate the development of compressive strength of the calcium aluminate cement. Preferably, the lithium salt should be added only to retarded or dormant calcium aluminate cements. Introduction of a lithium salt to a non-retarded or non-dormant calcium aluminate cement may undesirably accelerate setting of the calcium-aluminate cement, dependent upon the specific calcium-aluminate cement used and the other components in the treatment fluids. However, lithium salts added to retarded or dormant calcium-aluminate cements may prevent this risk. The lithium salt may be included in the treatment fluids in an amount in the range of about 0.01% to about 10% by weight of the cement (i.e., the weight of the calcium-aluminate cement). More particularly, the lithium salt may be present in an amount ranging between any of and/or including any of about 0.01%, about 0.1%, about 0.5%, about 1%, about 2%, about 3%, about 4%, about 5%, or about 10% by weight of the cement. One of ordinary skill in the art, with the benefit of this disclosure, should recognize the appropriate amount of lithium salt to include for a chosen application.

As previously mentioned, the treatment fluids may optionally comprise a dispersant. Examples of suitable dispersants may include, without limitation, sulfonated-formaldehyde-based dispersants (e.g., sulfonated acetone formaldehyde condensate), examples of which may include Daxad® 19 dispersant available from Geo Specialty Chemicals, Ambler, Pa. Additionally, polyoxyethylene phosphonates and polyox polycarboxylates may be used. Other suitable dispersants may be polycarboxylated ether dispersants such as Liquiment® 5581F and Liquiment® 514L dispersants available from BASF Corporation Houston, Tex.; or Ethacryl™ G dispersant available from Coatex, Genay, France. An additional example of a suitable commercially available dispersant is CFR'-3 dispersant, available from Halliburton Energy Services, Inc., Houston, Tex. The Liquiment® 514L dispersant may comprise 36% by weight of the polycarboxylated ether in water. While a variety of dispersants may be used, some dispersants may be preferred for use with specific cement set retarders. Additionally, it is important to use dispersants that do not undesirably affect the treatment fluids, for example, by inducing premature setting. One of ordinary skill in the art, with the benefit of this disclosure, should recognize the appropriate type of dispersant to include for a chosen application.

The dispersant may be included in the treatment fluids in an amount in the range of from about 0.01% to about 5% by weight of the cement (i.e., the weight of the calcium-aluminate cement). More particularly, the dispersant may be present in an amount ranging between any of and/or including any of about 0.01%, about 0.1%, about 0.5%, about 1%, about 2%, about 3%, about 4%, or about 5% by weight of the cement. One of ordinary skill in the art, with the benefit of this disclosure, will recognize the appropriate amount of dispersant to include for a chosen application.

The treatment fluids may optionally comprise a filler material. The filler material used for the treatment fluids may comprise any suitable filler material provided the filler material does not raise the alkalinity of the treatment fluids as this may induce the premature setting of the treatment fluids. Without limitation, the filler material may include silica, sand, fly ash, or silica fume. Generally, the filler material may be present in the treatment fluids in an amount sufficient to make the system economically competitive. The filler material may be present in the treatment fluids in an amount in the range of from about 0.01% to about 100% by weight of the cement (i.e., the calcium aluminate cement). More particularly, the filler material may be present in an amount ranging between any of and/or including any of about 0.01%, about 0.1%, about 1%, about 10%, about 25%, about 50%, about 75%, or about 100% by weight of the cement. One of ordinary skill in the art, with the benefit of this disclosure, should recognize the appropriate amount of filler material to include for a chosen application.

The treatment fluids may optionally comprise a viscosifier. The viscosifier may be included to optimize fluid rheology and to stabilize the suspension. Without limitation, examples of viscosifiers include synthetic polymers; swellable clays such as bentonite; inorganic particulates such as microsand, glass beads, and/or manganese oxide; or biopolymers such as cellulose derivatives (e.g., hydroxyethyl cellulose, carboxymethyl cellulose, carboxymethyl hydroxyethyl cellulose). An example of a commercially available viscosifier is SA-1015™ available from Halliburton Energy Services, Inc., Houston, Tex. The viscosifier may be included in the treatment fluids in an amount in the range of from about 0.01% to about 0.5% by weight of the cement (i.e., the calcium aluminate cement). In specific embodiments, the viscosifier may be present in an amount ranging between any of and/or including any of about 0.01%, about 0.05%, about 0.1%, about 0.2%, about 0.3%, about 0.4%, or about 0.5% by weight of the cement. One of ordinary skill in the art, with the benefit of this disclosure, will recognize the appropriate amount of viscosifier to include for a chosen application.

Other additives suitable for use in well operations also may be added to the treatment fluids as deemed appropriate by one of ordinary skill in the art. Examples of such additives include, but are not limited to, strength-retrogression additives, set weighting agents, lightweight additives, gas-generating additives, mechanical property enhancing additives, lost-circulation materials, defoaming agents, foaming agents, thixotropic additives, and combinations thereof. Specific examples of these, and other additives include silica (e.g., crystalline silica, amorphous silica, fumed silica, etc.), salts, fibers, hydratable clays, shale (e.g., calcined shale, vitrified shale, etc.), microspheres, diatomaceous earth, natural pozzolan, resins, latex, combinations thereof, and the like. Other optional additives may also be included, including, but not limited to, cement kiln dust, lime kiln dust, fly ash, slag cement, shale, zeolite, metakaolin, pumice, perlite, lime, silica, rice husk ash, small-particle size cement, combinations thereof, and the like. A person having ordinary skill in the art, with the benefit of this disclosure, will be able to determine the type and amount of additive useful for a particular application and desired result.

Strength-retrogression additives may be included in the treatment fluids to, for example, prevent the retrogression of strength after the treatment fluids have been allowed to develop compressive strength. These additives may allow the treatment fluids to form as intended, preventing cracks and premature failure. Examples of suitable strength-retrogression additives may include, but are not limited to, amorphous silica, coarse grain crystalline silica, fine grain crystalline silica, or a combination thereof.

Weighting agents are typically materials that weigh more than water and may be used to increase the density of the treatment fluids. By way of example, weighting agents may have a specific gravity of about 2 or higher (e.g., about 2, about 4, etc.). Examples of weighting agents that may be used include, but are not limited to, hematite, hausmannite, and barite, and combinations thereof. Specific examples of suitable weighting agents include HI-DENSE® weighting agent, available from Halliburton Energy Services, Inc.

Lightweight additives may be included in the treatment fluids to, for example, decrease the density of the treatment fluids. Examples of suitable lightweight additives include, but are not limited to, bentonite, coal, diatomaceous earth, expanded perlite, fly ash, gilsonite, hollow microspheres, low-density elastic beads, nitrogen, pozzolan-bentonite, sodium silicate, combinations thereof, or other lightweight additives known in the art.

Gas-generating additives may be included in the treatment fluids to release gas at a predetermined time, which may be beneficial to prevent gas migration from the formation through the treatment fluids before they hardens. The generated gas may combine with or inhibit the permeation of the treatment fluids by formation gas. Examples of suitable gas-generating additives include, but are not limited to, metal particles (e.g., aluminum powder) that react with an alkaline solution to generate a gas.

Mechanical-property-enhancing additives may be included in the treatment fluids to, for example, ensure adequate compressive strength and long-term structural integrity. These properties can be affected by the strains, stresses, temperature, pressure, and impact effects from a subterranean environment. Examples of mechanical property enhancing additives include, but are not limited to, carbon fibers, glass fibers, metal fibers, mineral fibers, silica fibers, polymeric elastomers, and latexes.

Lost-circulation materials may be included in the treatment fluids to, for example, help prevent the loss of fluid circulation into the subterranean formation. Examples of lost-circulation materials include but are not limited to, cedar bark, shredded cane stalks, mineral fiber, mica flakes, cellophane, calcium carbonate, ground rubber, polymeric materials, pieces of plastic, grounded marble, wood, nut hulls, plastic laminates (Formica® laminate), corncobs, and cotton hulls.

Defoaming additives may be included in the treatment fluids to, for example, reduce the tendency of the treatment fluids to foam during mixing and pumping of the treatment fluids. Examples of suitable defoaming additives include, but are not limited to, polyol silicone compounds. Suitable defoaming additives are available from Halliburton Energy Services, Inc., under the product name D-AIR™ defoamers.

Foaming additives (e.g., foaming surfactants) may be included in the treatment fluids to, for example, facilitate foaming and/or stabilize the resultant foam formed therewith. Examples of suitable foaming additives include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. An example of a suitable foaming additive is ZONESEALANT™ 2000 agent, available from Halliburton Energy Services, Houston, Tex.

Thixotropic additives may be included in the treatment fluids to, for example, provide a treatment fluid that may be pumpable as a thin or low viscosity fluid, but when allowed to remain quiescent attains a relatively high viscosity. Among other things, thixotropic additives may be used to help control free water, create rapid gelation as the treatment fluids set, combat lost circulation, prevent "fallback" in annular column, and minimize gas migration. Examples of suitable thixotropic additives include, but are not limited to, gypsum, water soluble carboxyalkyl, hydroxyalkyl, mixed carboxyalkyl hydroxyalkyl either of cellulose, polyvalent metal salts, zirconium oxychloride with hydroxyethyl cellulose, or a combination thereof.

Those of ordinary skill in the art will appreciate that embodiments of the treatment fluids generally should have a density suitable for a particular application. By way of example, the treatment fluids may have a density in the range of from about 4 pounds per gallon ("lb/gal") to about 20 lb/gal. In certain embodiments, the treatment fluids may have a density in the range of from about 8 lb/gal to about 17 lb/gal. Embodiments of the treatment fluids may be foamed or unfoamed or may comprise other means to reduce their densities, such as hollow microspheres, low-density elastic beads, or other density-reducing additives known in the art. In embodiments, the density may be reduced after storage, but prior to placement in a subterranean formation. In embodiments, weighting additives may be used to increase the density of the treatment fluids. Examples of suitable weighting additives may include barite, hematite, hausmannite, calcium carbonate, siderite, ilmenite, or combinations thereof. In particular embodiments, the weighting additives may have a specific gravity of 3 or greater. Those of ordinary skill in the art, with the benefit of this disclosure, will recognize the appropriate density required for a particular application.

As previously mentioned, when it is desirable for the treatment fluids to set, the treatment fluids may have a delayed set in that they may be capable of remaining in a pumpable fluid state for at least one day (e.g., about 1 day, about 2 weeks, about 2 years or more) at room temperature (e.g., about 80° F.) in storage. For example, the treatment fluids may remain in a pumpable fluid state for a period of time from about 1 day to about 7 days or more. In some embodiments, the treatment fluids may remain in a pumpable fluid state for at least about 1 day, about 7 days, about 10 days, about 20 days, about 30 days, about 40 days, about 50 days, about 60 days, or longer. A fluid is considered to be in a pumpable fluid state where the fluid has a consistency of less than 70 Bearden units of consistency ("Bc"), as measured on a pressurized consistometer in accordance with the procedure for determining cement thickening times set forth in API RP Practice 10B-2, *Recommended Practice for Testing Well Cements*, First Edition, July 2005.

As discussed above, when setting is desirable, the treatment fluids may be activated (e.g., by addition of a cement set activator) to set into a hardened mass. The term "activate", as used herein, refers to the activation of any calcium aluminate cement in the treatment fluids and in certain cases may also refer to the acceleration of the setting of any calcium aluminate cement in the treatment fluids, if the mechanism of said activation also accelerates the development of compressive strength. By way of example, a cement set activator may be added to a treatment fluid to activate the treatment fluid. A treatment fluid that has been activated may set to form a hardened mass in a time period in the range of from about 1 hour to about 12 days. For example, embodiments of the treatment fluids may set to form a hardened mass in a time period ranging between any of and/or including any of about 1 hour, about 6 hours, about 12 hours, about 1 day, about 2 days, about 4 days, about 6 days, about 8 days, about 10 days, or about 12 days.

The treatment fluids may set to have a desirable compressive strength after activation. Compressive strength is generally the capacity of a material or structure to withstand axially directed pushing forces. The compressive strength may be measured at a specified time after the activation of the calcium aluminate cement while the treatment fluid is maintained under specified temperature and pressure conditions. Compressive strength can be measured by either destructive or non-destructive methods. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods may employ a UCA™ Ultrasonic Cement Analyzer, available from Fann Instrument Company, Houston, Tex. Compressive strength values may be determined in accordance with API RP 10B-2, *Recommended Practice for Testing Well Cements*, First Edition, July 2005.

By way of example, the treatment fluids may develop a 24-hour compressive strength in the range of from about 50 psi to about 5000 psi, alternatively, from about 100 psi to about 4500 psi, or alternatively from about 500 psi to about 4000 psi. In particular, the treatment fluids may develop a compressive strength in 24 hours of at least about 50 psi, at least about 100 psi, at least about 500 psi, or more. The compressive strength values may be determined using destructive or non-destructive methods at any temperature, however compressive strength development at temperatures ranging from 70° F. to 140° F. may be of particular importance for potential use in subterranean formations having relatively low bottom hole static temperatures.

In some examples, the treatment fluids may have desirable thickening times. Thickening time typically refers to the time a fluid, such as a treatment fluid, remains in a fluid state capable of being pumped. A number of different laboratory techniques may be used to measure thickening time. A pressurized consistometer, operated in accordance with the procedure set forth in the aforementioned API RP Practice 10B-2, may be used to measure whether a fluid is in a pumpable fluid state. The thickening time may be the time for the treatment fluid to reach 70 Bc and may be reported as the time to reach 70 Bc. The treatment fluids may have thickening times greater than about 1 hour, alternatively, greater than about 2 hours, greater than about 15 hours, greater than about 30 hours, greater than about 100 hours, or alternatively greater than about 190 hours at 3,000 psi and temperatures in a range of from about 50° F. to about 400° F., alternatively, in a range of from about 70° F. to about 140° F., and alternatively at a temperature of about 100° F. As will be illustrated in the examples below, thickening times may be controlled by the degree to which the pH of the treatment fluid is increased. This is related, to a degree, to the concentration of the cement set activator and allows for a quantitative method of controlling the set time of the treatment fluids.

The treatment fluids described above may be used in a variety of applications. For example, the treatment fluids disclosed herein may be used as a drilling fluid for drilling a wellbore in a subterranean formation by circulating a treatment fluid while drilling a wellbore in contact with a drill bit and a subterranean formation. After the treatment fluids are used to drill a wellbore in a subterranean formation, a casing may be placed within the wellbore. If desired, all or a portion of the treatment fluid may be permitted to set behind the casing.

A method of treating a well may be provided. The method may include one or all of the components and/or steps illustrated in FIGS. 1-7. The method may comprise providing a treatment fluid comprising calcium-aluminate cement, water, and a cement set retarder; and introducing the treatment fluid into a wellbore. The step of introducing the treatment fluid into the wellbore may comprise introducing the treatment fluid into the wellbore while a drill bit is present in the wellbore. The step of introducing the treatment fluid into the wellbore may displace at least a portion of a drilling fluid from the wellbore. At least a portion of the treatment fluid may be recovered and used as a drilling fluid, a displacement fluid, a spotting fluid, a cement, or a combination thereof. The method may further comprise the steps of recovering at least a portion of the treatment fluid; activating said portion of the treatment fluid with a cement set activator; and placing the activated treatment fluid into the wellbore. At least a portion of the treatment fluid may be allowed to remain in the wellbore. At least a portion of the treatment fluid may be allowed to set behind a conduit placed into the wellbore. At least a portion of the treatment fluid may be allowed to remain static in the wellbore, and the treatment fluid may remain in a pumpable fluid state for a period of about 1 day or longer while static in the wellbore. The treatment fluid may be introduced into the wellbore such that the treatment fluid forms a puddle in the bottom of the wellbore, said method may further comprise the steps of placing a conduit into the puddle formed by the treatment fluid in the bottom of the wellbore; and inducing the treatment fluid to set in an annulus surrounding the conduit. The cement set retarder may be selected from the group consisting of hydroxycarboxylic acids or their respective salts, boric acid or its respective salt, and any combination thereof. The treatment fluid may further comprise a cement set activator selected from the group consisting of Groups IA and IIA hydroxides; alkaline aluminates; Portland cement, and combinations thereof. The treatment fluid may further comprise a cement set accelerator selected from the group consisting of lithium sulfate, lithium carbonate, and any combination thereof.

A system of treating a well may be provided. The system may include one or all of the components illustrated in FIGS. 1-7. The system may comprise a treatment fluid comprising calcium-aluminate cement, water, and a cement set retarder; a vessel to contain the treatment fluid; a pumping system coupled to the vessel to pump the treatment fluid; and a conduit coupled to the pumping system. The system may further comprise a storage system for storing the treatment fluid. The system may further comprise a drilling system for drilling a wellbore. The system may further comprise a treatment fluid recovery system for recovering at least a portion of the treatment fluid from a wellbore. The cement set retarder may be selected from the group consisting of hydroxycarboxylic acids or their respective salts, boric acid or its respective salt, and any combination thereof. The treatment fluid may further comprise a cement set activator selected from the group consisting of Groups IA and IIA hydroxides; alkaline aluminates; Portland cement, and combinations thereof. The treatment fluid may further comprise a dispersant selected from the group consisting of sulfonated-formaldehyde-based dispersant, a polycarboxylated ether dispersant, and any combination thereof. The treatment fluid may further comprise a cement set accelerator selected from the group consisting of lithium sulfate, lithium carbonate, and any combination thereof.

The example treatment fluids disclosed herein may directly or indirectly affect one or more components or pieces of equipment associated with the preparation, delivery, recapture, recycling, reuse, and/or disposal of the disclosed treatment fluids. Any of the treatment fluids described herein may be contained within a vessel and/or any type of sufficient storage system. Without limitation, examples of such vessels, may include mud pits, barrels, mixers, drums, trucks, storage containers, etc. Some of the example vessels may comprise mixing equipment, for example, baffles. Any of the vessel examples may be coupled to any of the pumps, pumping systems, conduits, or fluid recovery systems disclosed herein. Any of the pumps, pumping systems, or conduits disclosed herein may be coupled to one another as well as any other upstream or downstream system or equipment, such as vessels, storage systems. Fluid recovery systems, and the like. Further, fluid recovery systems comprising vessels and/or pumping systems may be used to recovery any of the treatment fluids described herein. These recovered treatment fluids may be reconditioned and recycled, may be stored (e.g., using a storage system or vessel), or may simply be reused.

The treatment fluids disclosed herein may be used as a drilling fluid. The drilling fluids used herein comprise the formulations of the disclosed treatment fluids discussed above. The disclosed treatment fluids may be used to aid in the drilling of a wellbore, e.g., by circulating drill cuttings back to the surface via the annulus between the drill string and the walls of the wellbore. If desired, the drilling fluid may be permitted to set behind the casing.

With reference to FIG. 1, the disclosed treatment fluids may directly or indirectly affect one or more components or pieces of equipment associated with an example wellbore drilling assembly 100. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, conduits such as drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122, which may have been stored in a vessel prior to use, comprising at least one of the treatment fluids disclosed herein, through a feed pipe 124 and to the kelly 110, which conveys the drilling fluid 122 downhole through the interior of the drill string 108 and through one or more orifices in the drill bit 114. The pump 120 may be part of a pumping system. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit), which may function as a vessel or storage system for the drilling fluid. While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure. In alternative examples, at least a portion of the drilling fluid 122 may be left behind in the wellbore, and optionally the calcium aluminate cement in the drilling fluid may be activated with a cement set activator and allowed to set behind the casing. In further optional examples, at least a portion of the drilling fluid 122 may be recovered and used as another treatment fluid, for example, as a displacement fluid, spotting fluid, a cement, or the like.

The drilling fluid 122 may be added to a mixing hopper 134, a type of vessel, communicably coupled to or otherwise in fluid communication with the retention pit 132. The mixing hopper 134 may include, but is not limited to, mixers and related mixing equipment known to those skilled in the art. In alternative embodiments, however, the drilling fluid 122 may not be added to a mixing hopper. In at least one example, there could be more than one retention pit 132, such as multiple retention pits 132 in series. Moreover, the retention pit 132 may be representative of one or more fluid storage facilities and/or units where the disclosed treatment fluids may be stored, reconditioned, and/or regulated until used as a treatment fluid, for example, as a drilling fluid 122.

As mentioned above, the drilling fluid 122 may directly or indirectly affect the components and equipment of the drilling assembly 100. For example, the drilling fluid may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment. The fluid processing unit(s) 128 may further include one or more sensors, gauges, pumps, compressors, and the like used store, monitor, regulate, and/or recondition the treatment fluids.

The disclosed drilling fluids may directly or indirectly affect the pump 120 and any pumping systems, which representatively includes any conduits, pipelines, trucks, tubulars, and/or pipes which may be coupled to the pump and/or any pumping systems and may be used to fluidically convey the drilling fluid downhole, any pumps, compressors, or motors (e.g., topside or downhole) used to drive the drilling fluid into motion, any valves or related joints used to regulate the pressure or flow rate of the drilling fluid, and any sensors (i.e., pressure, temperature, flow rate, etc.), gauges, and/or combinations thereof, and the like. The disclosed drilling fluids may also directly or indirectly affect the mixing hopper 134 and the retention pit 132 and their assorted variations.

The disclosed drilling fluids may also directly or indirectly affect the various downhole equipment and tools that may come into contact with the drilling fluids such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed drilling fluids may also directly or indirectly affect any downhole heat exchangers, valves and corresponding actuation devices, tool seals, packers and other wellbore isolation devices or components, and the like associated with the wellbore 116. The drilling fluids may also directly or indirectly affect the drill bit 114, which may include, but is not limited to, roller cone bits, PDC bits, natural diamond bits, any hole openers, reamers, coring bits, etc.

While not specifically illustrated herein, the drilling fluids may also directly or indirectly affect any transport or delivery equipment used to convey the drilling fluids to the drilling assembly 100 such as, for example, any transport vessels, conduits, pipelines, trucks, tubulars, and/or pipes used to fluidically move the drilling fluids from one location to another, any pumps, compressors, or motors used to drive the drilling fluids into motion, any valves or related joints used to regulate the pressure or flow rate of the drilling fluids, and any sensors (i.e., pressure and temperature), gauges, and/or combinations thereof, and the like.

The treatment fluids disclosed herein may also be used as a displacement or spacer fluid. The displacement fluids used herein comprise the formulations of the disclosed treatment fluids discussed above. The disclosed treatment fluids may be used to displace a drilling mud or other treatment fluid, e.g., by circulating a displacement fluid comprising at least one of the treatment fluids disclosed herein back to the surface via the annulus between the drill string and the walls of the wellbore. As the displacement fluid is circulated back to the surface, it displaces any prior placed fluids remaining in the wellbore. If desired, the displacement fluid may be permitted to set behind the casing.

The density of the displacement fluids may be adjusted by the addition of water and/or a viscosifier. The water and/or viscosifier may be added in any amount to achieve the appropriate density for a rheological hierarchy for a given application. An example of a suitable viscosifier is SA-1015™ suspending agent available from Halliburton Energy Services, Houston, Tex. Additionally, light weight and heavy weight agents may also be added to adjust the density as is appropriate to maintain the rheological hierarchy. One of ordinary skill in the art, with the benefit of this disclosure, will recognize the appropriate density and method of density adjustment necessary for a chosen application.

The displacement fluids may also be foamed with a foaming additive and/or a gas, for example, to provide a displacement fluid with a reduced density. The gas used for foaming the displacement fluid may be any suitable gas for foaming, including, but not limited to: air, nitrogen, and combinations thereof. Generally, the gas should be in an amount sufficient to form the desired foam. Foaming additives may be included in embodiments to, for example, facilitate foaming and/or stabilize the resultant foam formed therewith. Examples of suitable foaming additives include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. An example of a suitable foaming additive is ZONESEALANT™ 2000 agent, available from Halliburton Energy Services, Houston, Tex.

Figure 2:
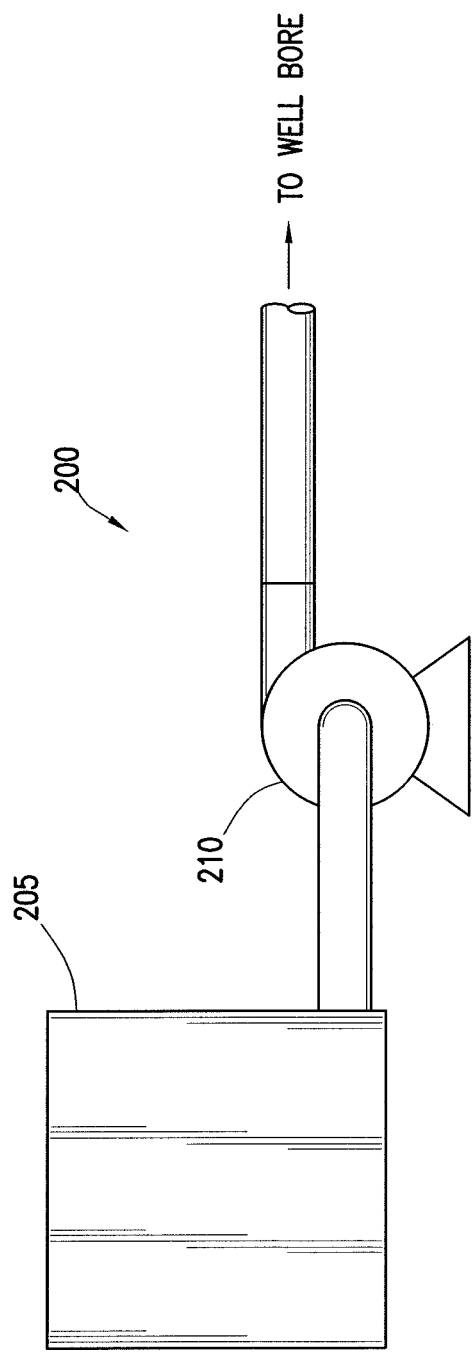
FIG. 2 illustrates surface equipment that may be used in the placement of a displacement fluid in a wellbore in accordance with certain examples.
Figure 3:
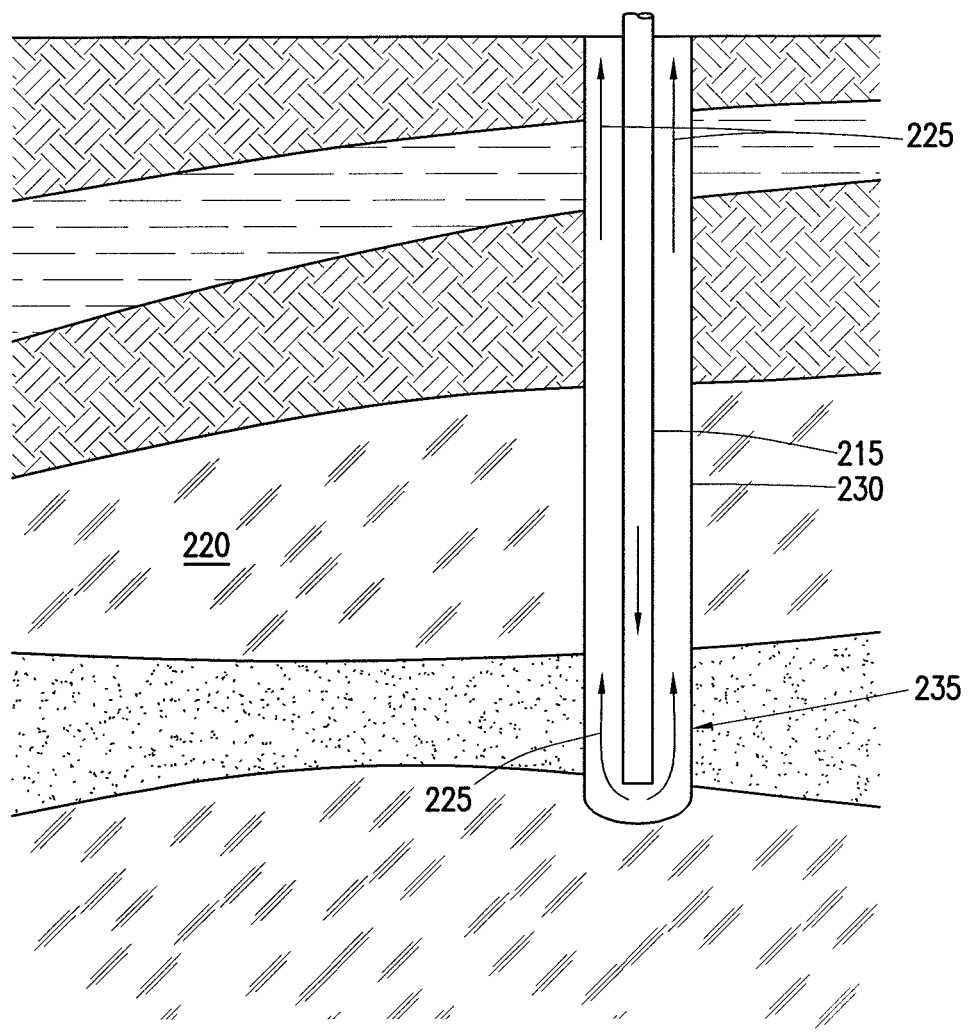
FIG. 3 illustrates a method for displacing a prior pumped fluid using a displacement fluid.

Referring now to FIG. 2, a fluid handling system 200 is illustrated. A displacement fluid comprising at least one of the treatment fluids disclosed herein may be mixed in mixing equipment 205, such as a mixer, recirculating tub, or any type of vessel comprising mixing equipment, and then pumped via pump 210 or any type of pumping system to the well bore. As illustrated in FIG. 3, the displacement fluid and any subsequent fluid (e.g., a cement composition) may be pumped into the casing 215 in the direction shown by the arrows. The displacement fluid may be pumped through the casing 215, a type of conduit, and through or into the subterranean formation 220 until it reaches the end point and is pushed upward into the annulus 225 which resides between the pipe casing 215 and walls 230 of well bore 235. The displacement fluid may displace any prior pumped fluid (e.g., a drilling fluid) and may also separate any subsequently pumped fluid (e.g., a cement composition). If desired, at least a portion of the displacement fluid may be left behind in the wellbore and optionally the calcium aluminate cement in the displacement fluid may be activated with a cement set activator and allowed to set behind the casing. In further optional examples, at least a portion of the displacement fluid may be recovered and used as another treatment fluid, for example, as a drilling fluid, spotting fluid, a cement, or the like. The recovered treatment fluid may be recovered using a recovery system and optionally a storage system, said systems may comprise some of the equipment discussed above, for example vessels, pumps, conduits, etc.

Figure 4:
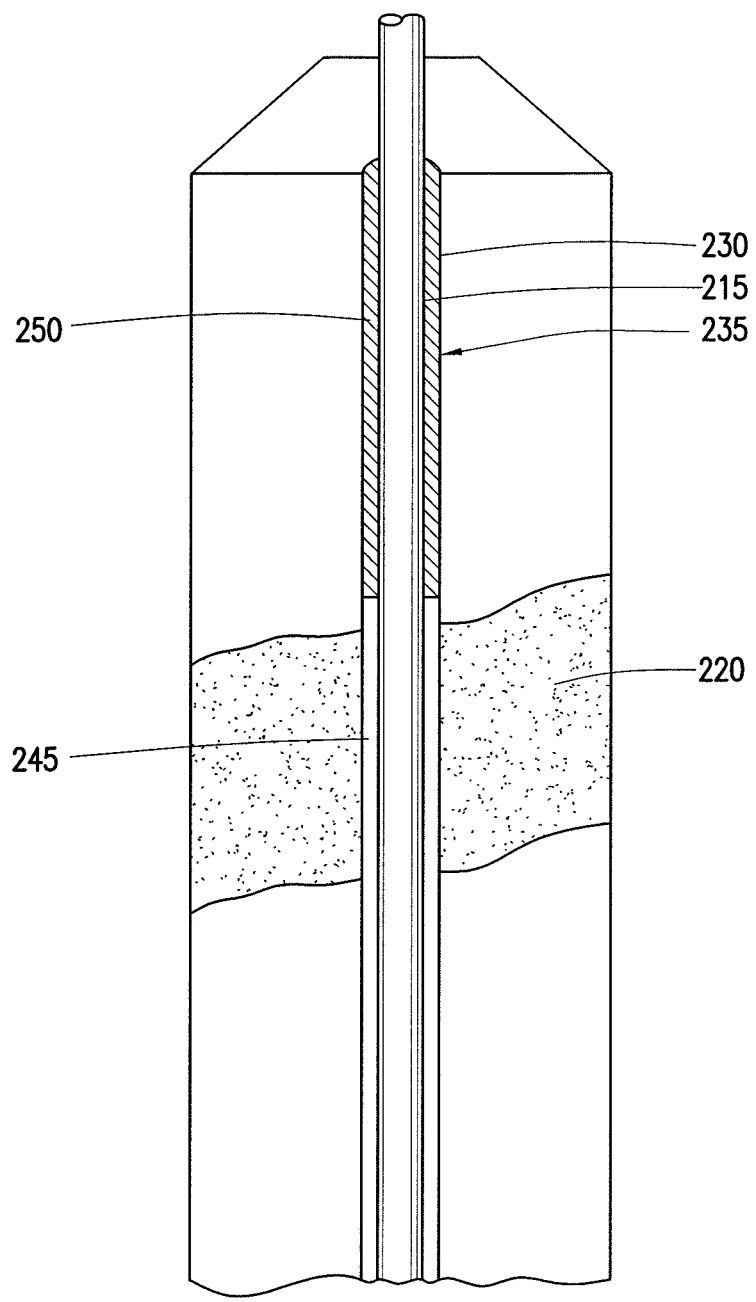
FIG. 4 illustrates the placement of a cement composition behind a displacement fluid in a wellbore in accordance with certain examples.

FIG. 4 illustrates a displacement fluid that has been allowed to remain in a wellbore after displacing a drilling fluid from the wellbore and after subsequent pumping of a cement composition into the wellbore. Cement composition 245 is pumped downhole so that the cement composition 245 is disposed between the walls 230 of the wellbore 235 and the casing 215. As illustrated, the displacement fluid 250 may be disposed in the wellbore 235 above the cement composition 245. The displacement fluid 250 may be disposed between the walls 230 of the wellbore 235 and the casing 215. The displacement fluid 250 may be allowed to remain between the walls 230 of the wellbore 235 and the casing 215 if desired. Additionally, displacement fluid 250 may be allowed to set into a hardened mass between the walls 230 of the wellbore 235 and the casing 215. Setting of the displacement fluid 250 may be induced through contact with a cement set activator or any such sufficient method of activation.

The treatment fluids disclosed herein may also be used as a spotting fluid. The spotting fluids used herein comprise the formulations of the disclosed treatment fluids discussed above. The disclosed spotting fluids may be used to displace a drilling mud or other treatment fluid in a typical spotting fluid operation, for example, to free a differentially stuck pipe or in other types of spotting fluid applications such as "puddle jobs." As related to the disclosure above detailing the drilling fluid applications and displacement fluid applications, if desired, at least a portion of the spotting fluid, which comprises at least one of the treatment fluids disclosed herein, may be left behind in the wellbore to set into a hardened mass. In further optional examples, at least a portion of the spotting fluid may be recovered and used as another treatment fluid, for example, as a drilling fluid, displacement fluid, a cement, or the like.

An example of using a treatment fluid comprising a spotting fluid will now be described with reference to FIGS. 5A-5D. The spotting fluid may be pumped into the wellbore using any sufficient means, for example, the means described above for pumping the drilling fluids and displacement fluids. FIG. 5A depicts subterranean formation 300 penetrated by wellbore 305 with drilling fluid 310 disposed therein. While the wellbore 305 is shown extending generally vertically into the subterranean formation 300, the principles described herein are also applicable to wellbores that extend at an angle through the subterranean formation 300, such as horizontal and slanted wellbores. The wellbore 305 may be drilled into the subterranean formation 300 using any suitable drilling technique. As illustrated, the drilling fluid 310 may be introduced into the wellbore 305 through a drill string and bottom hole assembly 315. On the walls 320 of the wellbore 305 may be found pockets 325 which may have been created from washouts, fractures, crevices and/or otherwise naturally occurring features of the subterranean formation 300. A spotting fluid 330 may be run behind the drilling fluid 310, which occupies the lower portion of the drill string and bottom hole assembly 315.

FIG. 5B depicts the subterranean formation 300 with the drill string and bottom hole assembly 315 still placed downhole, and the spotting fluid 330 circulated through the drill string and bottom hole assembly 315 such that it exits the drill string and bottom hole assembly 315 and travels upward through the annulus 335 between the drill string and bottom hole assembly 315 and the walls 320 of wellbore 305, thus displacing the drilling fluid 310. At least a portion of the displaced drilling fluid 310 may exit the annulus 335 via a flow line and be deposited, for example, in one or more retention pits (e.g., a mud pit). While the spotting fluid 330 is exiting the drill string and bottom hole assembly 315 downhole, the drill string and bottom hole assembly 315 may be circulated and reciprocated in a manner that improves removal of the drilling fluid 310 trapped along the wellbore walls 320 and in the pockets 325.

As shown in FIG. 5C, after the drilling fluid 310 is displaced by the spotting fluid 330, the drill string and bottom hole assembly 315 may be removed and a casing string 340 may be placed into the wellbore 305. A cement composition 345 may then be run behind the spotting fluid 330 in the casing string 340, and, as depicted in FIG. 5D, circulated through the casing string 340 such that it exits the bottom of the casing string 340 and travels upward through the annulus 335 between the casing string 340 and the walls 320 of the wellbore 305 to the predetermined top-of-cement depth. If desired, any of the spotting fluid 330 that is not displaced and remains on the walls 320 of the wellbore 305 and/or in the pockets 325, may be induced to set into a hardened mass 350, therefore precluding the formation of undesirable channels and pathways through which fluids may migrate.

Figure 6A:
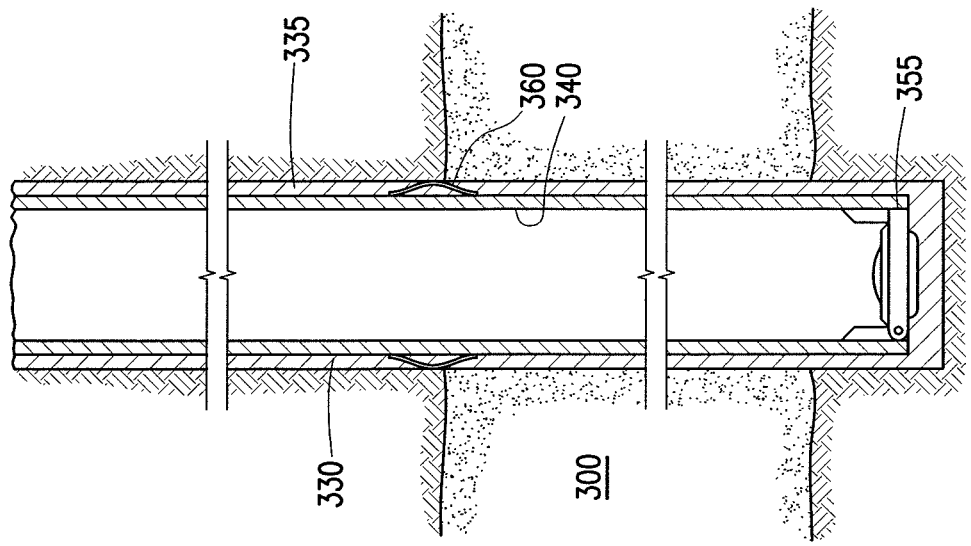
FIG. 6A illustrates a method for the placement of a spotting fluid into a wellbore in accordance with certain examples.

An example of using a spotting fluid 330 in a "puddle job" operation will now be described with reference to FIGS. 6A and 6B. Referring now to FIG. 6A, the wellbore 305 is illustrated penetrating subterranean formation 300. A casing string 340 may be run into the wellbore 305 to a depth placing the lower end of the casing string 340 to be cemented above the critical interval through which a cement sheath is desired. Mounted on the lower end of the casing string 340 may be a float valve 355 or any other type of plug (e.g., any sufficient sealing plug and not necessarily a valve). In embodiments, the float valve 355 may be a float valve of any type (e.g., a flapper float valve). The casing string 340 may have centralizers 360 (e.g., as shown on FIG. 6B) along its length to keep the casing string 340 away from the walls 320 of the wellbore 305.

The spotting fluid 330 may be pumped and discharged into the lower end of the wellbore 305. The spotting fluid 330 may be discharged into the lower end of the wellbore 305 via a drill string and bottom hole assembly 315 (e.g., as shown in FIGS. 5A and 5B) which may be placed into the wellbore 305 prior to positioning the casing string 340 into the wellbore 305. Alternatively, the spotting fluid 330 may be discharged into the lower end of the wellbore 305 via a drill string and bottom hole assembly 315 (or other suitable conduit) that is run through the casing string 340 such that the drill string and bottom hole assembly 315 exit through the lower end of the casing string 340 via the float valve 355. The volume of the spotting fluid 330 pumped into the wellbore 305 may depend on a number of factors, including the length of the interval needed to be set. For example, the spotting fluid 330 may remain in a pumpable fluid state (i.e., the spotting fluid has a consistency of less than 70 Bc) for a period of 1 day, 3 days, 7 day, or longer. In practice, the spotting fluid 330 should not set in the wellbore 305 until all operations requiring the spotting fluid 330 to remain in a pumpable fluid state have been completed. It is therefore beneficial to have an accurate estimate of the duration of such operations prior to the formulation of the spotting fluid 330 and to avoid contacting the spotting fluid 330 with any material which may induce premature setting such as materials which may increase the pH of spotting fluid 330.

Figure 6B:
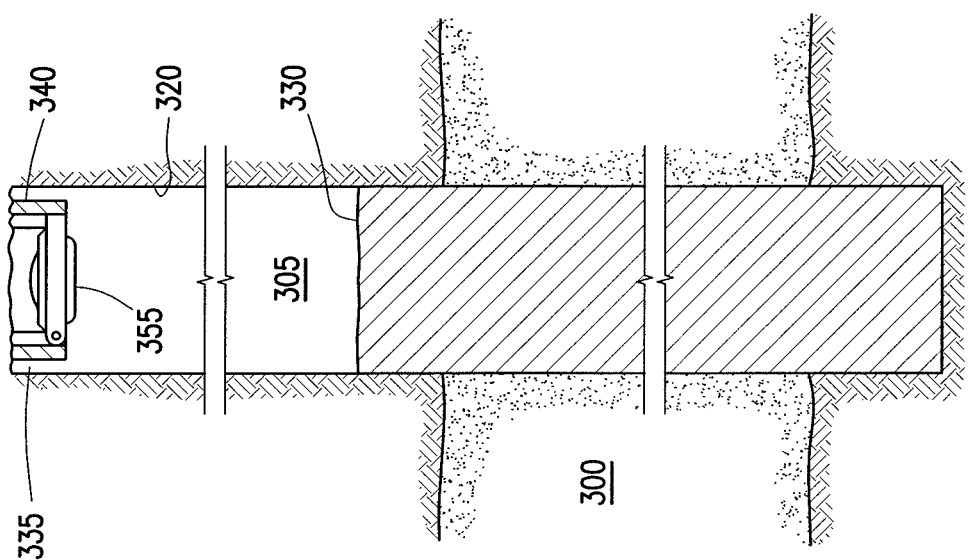
FIG. 6B illustrates the placement of a pipe string into a wellbore annulus at least partially filled with a spotting fluid in accordance with certain examples.

Turning now to FIG. 6B, after the desired volume of the spotting fluid 330 has been discharged into the wellbore 305, the casing string 340 may be lowered to the desired depth within the wellbore 305. As illustrated, the casing string 340 is lowered into spotting fluid 330 in the lower end of the wellbore 305. The float valve 355 should prevent entry of the spotting fluid 330 into the casing string 340. As the casing string 340 is lowered into wellbore 305, the spotting fluid 330 may be displaced from the middle of the wellbore 305 by the casing string 340 with the annulus 335 surrounding the casing string 340 containing the spotting fluid 330. The spotting fluid 330 may be forced up the annulus 335 causing the spotting fluid 330 to displace any other fluids (e.g., drilling fluid 310 (as shown in FIGS. 5A and 5B) and/or any other fluids such as other treatment fluids) that may have remained in the wellbore 305. If desired, the casing string 340 may then be suspended in the wellbore 305 until the spotting fluid 330 disposed in the annulus 335 has set into a hardened mass. As discussed above, setting of the spotting fluid 330 may be induced through contact with a cement set activator.

The exemplary treatment fluids disclosed herein may directly or indirectly affect one or more components or pieces of equipment associated with the preparation, delivery, recapture, recycling, reuse, and/or disposal of the disclosed treatment fluids. For example, the disclosed treatment fluids may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary treatment fluids. The disclosed treatment fluids may also directly or indirectly affect any transport or delivery equipment used to convey the treatment fluids to a well site or downhole such as, for example, any transport vessels, conduits, pipelines, trucks, tubulars, and/or pipes used to compositionally move the treatment fluids from one location to another, any pumps, compressors, or motors (e.g., topside or downhole) used to drive the treatment fluids into motion, any valves or related joints used to regulate the pressure or flow rate of the treatment fluids, and any sensors (i.e., pressure and temperature), gauges, and/or combinations thereof, and the like. The disclosed treatment fluids may also directly or indirectly affect the various downhole equipment and tools that may come into contact with the treatment fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

EXAMPLES

To facilitate a better understanding of the present claims, the following examples of certain aspects of the disclosure are given. In no way should the following examples be read to limit, or define, the entire scope of the claims.

Example 1

A treatment fluid sample was obtained which comprised about 40% to about 70% calcium aluminate cement by weight, about 33% to about 200% water by weight, about 0.01% to about 10% cement set retarder by weight, and about 0.01% to about 5% dispersant by weight. In the examples, the terms "by weight" or "by wt." refers to by weight of the treatment fluid. The treatment fluid was obtained from Kerneos, Inc., Chesapeake, Va.; as a retarded calcium-aluminate system comprising a suspension of calcium-aluminate cement that was 40-70% solids. The calculated density of the treatment fluid was 14.68 ppg.

The apparent viscosities and FYSA decay readings of the sample was measured at Day 0 and after storage at DAY 48 using a Model 35A Fann Viscometer and a No. 2 spring with a Fann Yield Stress Adapter (FYSA), in accordance with the procedure set forth in API RP Practice 10B-2, *Recommended Practice for Testing Well Cements*. The data is presented in Table 1 below.

TABLE 1

Treatment Fluid Rheological Profile

| | FYSA Readings | | | | | | | |
|---|---|---|---|---|---|---|---|---|
| | 3 | 6 | 100 | 200 | 300 | 600 | 3D | 6D |
| Day 0 | 17759 | 10212 | 1305 | 839 | 666 | 506 | 7 | 4 |
| Day 48 | 16871 | 9768 | 1265 | 806 | 644 | 506 | 5.5 | 5.5 |
| Day 181 | 32411 | 18647 | 2464 | 1598 | 1261 | 901 | 13 | 11 |

As shown by these measurements, the slurry rheology remained stable for at least 48 days with little to no change in the calculated apparent viscosity. No settling of solids or free fluid was observed in the samples over the test period further supporting the high degree of slurry stability. At 181 days, there was no settling or free fluid even though the apparent viscosity had increased. Any gel that had formed, and which contributed to the increased viscosity, was easily broken upon stirring to return the slurry back to a flowable, pourable slurry.

Example 2

Another sample identical to that used in Example 1 was stored for 5 months. After storage the apparent viscosities and FYSA decay readings of the sample were measured over a 17 day period in the same manner as described in Example 1. The data is presented in Table 2 below.

TABLE 2

Treatment Fluid Rheological Profile

| | FYSA Readings | | | | | | | |
|---|---|---|---|---|---|---|---|---|
| | 3 | 6 | 100 | 200 | 300 | 600 | 3D | 6D |
| Day 0 | 14507 | 8387 | 1088 | 680 | 526 | 372 | 3.0 | 3.0 |
| Day 3 | 11787 | 8160 | 1061 | 666 | 517 | 367 | 3.0 | 3.5 |
| Day 5 | 14507 | 8613 | 1115 | 707 | 553 | 431 | 3.0 | 2.5 |
| Day 7 | 11787 | 8160 | 1088 | 694 | 549 | 422 | 3.0 | 3.0 |
| Day 10 | 14507 | 8613 | 1088 | 687 | 549 | 422 | 3.5 | 3.0 |
| Day 12 | 14053 | 8160 | 1088 | 687 | 539 | 417 | 2.5 | 3.0 |
| Day 14 | 14507 | 8387 | 1088 | 687 | 549 | 417 | 2.5 | 2.5 |
| Day 17 | 13147 | 8160 | 1088 | 687 | 539 | 408 | 2.0 | 3.0 |

Despite storing the treatment fluid for 5 months, the slurry rheology remained stable with little to no change in the calculated apparent viscosity. No settling of solids or free fluid was observed in the samples over the test period as well as after a further 4 months of storage further supporting the high degree of slurry stability.

Example 3

Four samples identical to that used in Examples 1 and 2 were activated by the addition of a 4M NaOH (aq.) solution. The thickening times of the four samples and a control sample were measured on a high-temperature high-pressure consistometer by ramping from room temperature (e.g., about 70° F. for this example) and ambient pressure to 100°

F. and 3000 psi in 15 minutes in accordance with the procedure for determining cement thickening times set forth in API RP Practice 10B-2, *Recommended Practice for Testing Well Cements*, First Edition, July 2005. The thickening time is the time for the treatment fluid to reach 70 Bc and may be reported as the time to reach 70 Bc. Additionally the pH of each sample was measured after each sample had been activated. The results of this test are set forth below in Table 3.

TABLE 3

Treatment Fluid Thickening Time Measurements

| Cement Set Activator Amount (% by wt.) | Thickening Time (hrs.) | pH |
|---|---|---|
| 4 | 2 | 12.3 |
| 2 | 6 | 10.6 |
| 1.5 | 19 | 9.6 |
| 1 | 190+ | 8.5 |
| 0 | — | 6.3 |

It was discovered that control over thickening times may be achieved by varying the concentration of the activator. The results indicate a dependence on concentration of the activator and the pH of the activated treatment fluid.

Example 4

A sample identical to that used in Examples 1 and 2 was activated by the addition of a 1% by weight 4M NaOH (aq.) solution. The sample was split into four separate experimental samples and the thickening times of the four samples were measured on a high-temperature high-pressure consistometer by ramping from room temperature (e.g., about 70° F. for this example) and ambient pressure to a temperature of either 100° F., 140° F., 180° F., or 220° F. in 15 minutes, 35 minutes, 55 minutes, or 75 minutes respectively (i.e. a ramp of 2° F./min.), while holding the pressure constant at 3000 psi; in accordance with the procedure for determining cement thickening times set forth in API RP Practice 10B-2, *Recommended Practice for Testing Well Cements*, First Edition, July 2005. The thickening time is the time for the treatment fluid to reach 70 Bc and may be reported as the time to reach 70 Bc. The results of this test are set forth below in Table 4.

TABLE 4

Treatment Fluid Thickening Time Measurements

| Sample | Temperature (° F.) | Thickening Time (hrs.) |
|---|---|---|
| A | 100 | 190+ |
| B | 140 | 47.25 |
| C | 180 | 20.25 |
| D | 220 | 11 |

The results illustrate that the thickening times are dependent upon temperature, however, the effect of temperature does not appear to effect the thickening times in a significant manner unless the temperature is greater than 100° F. Thus, for uses of the treatment fluids at temperatures greater than 100° F., the temperature must be considered when calculating thickening times.

Example 5

A sample identical to that used in Examples 1 and 2 was activated by the addition of a 2% by weight 4M NaOH (aq.) cement set activator solution. The sample was split into three separate experimental samples. A lithium salt ($Li_2CO_3$) cement set accelerator was added to experimental sample F in an amount of 0.5% by weight as cement set accelerator A. A different lithium salt ($Li_2SO_4.H_2O$) cement set accelerator was added to experimental sample G in an amount of 0.5% by weight as cement set accelerator B.

The two experimental samples were then split further so that their 24 hour compressive strengths could be measured at varying temperature. The samples were cured in 2" by 4" plastic cylinders that were placed in a water bath at 140° F. for 24 hours to form set cylinders. Then, the destructive compressive strength (C.S.) was measured using a Tinius Olsen mechanical press in accordance with API RP Practice 10B-2, *Recommended Practice for Testing Well Cements*. The reported compressive strengths are an average for two cylinders of each sample. Compressive strength measurements were taken at 24 hours.

The thickening times of each sample was also measured on a high-temperature high-pressure consistometer by ramping from room temperature (e.g., about 70° F. for this example) and ambient pressure to 100° F. and 3000 psi in 15 minutes in accordance with the procedure for determining cement thickening times set forth in API RP Practice 10B-2, *Recommended Practice for Testing Well Cements*, First Edition, July 2005. The thickening time is the time for the treatment fluid to reach 70 Bc and may be reported as the time to reach 70 Bc. The results of these tests are set forth below in Table 5.

TABLE 5

Treatment Fluid Thickening Time Measurements

|  | Sample E | Sample F | Sample G |
|---|---|---|---|
| Compositional Makeup |  |  |  |
| Cement Set Activator | 2% by wt. | 2% by wt. | 2% by wt. |
| Cement Set Accelerator A | — | 0.5% by wt. | — |
| Cement Set Accelerator B | — | — | 0.5% by wt. |
| pH |  |  |  |
| Before Activation | 6.3 | 6.3 | 6.3 |
| After Activation | 10.91 | 10.91 | 10.91 |
| Compressive Strength (psi) |  |  |  |
| 140° F. | 463.4 | 1516.1 | 1815.2 |
| Thickening Time (hh:mm) | 6:00 | 5:15 | — |

The results illustrate that the addition of a lithium salt improves compressive strength of a treatment fluid for the temperature range tested without decreasing the thickening time by a substantial degree. Without being limited by theory, it is believed that lithium sulfate monohydrate may have provided better compressive strength results due to its greater solubility in water. Additionally, the addition of a lithium carbonate reduced the thickening time by only 45 minutes while still showing a large compressive strength development relative to the control Sample A which did not include a lithium salt. Such a result demonstrates "right-angle" set behavior.

Figure 7:
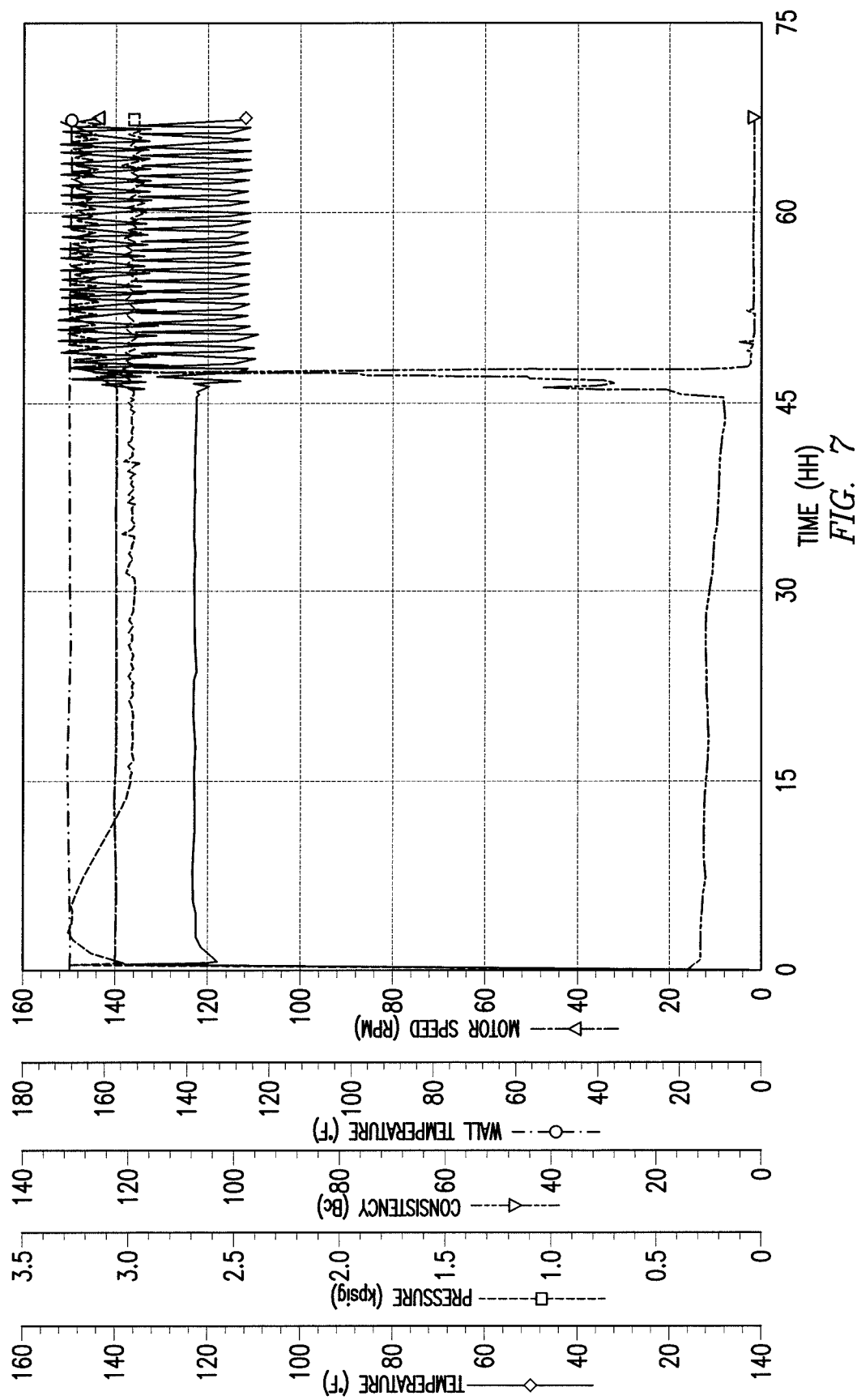
FIG. 7 illustrates a "right-angle" set profile of a treatment fluid in accordance with certain examples.

As described above, some of the treatment fluids may exhibit "right-angle" set behavior such that the slurry consistency remains low, for example, less than 30 Bc, until the thickening time is reached at which point the slurry rapidly gains high levels of strength. Therefore, some formulations of the treatment fluids may also mitigate gelation and provide a treatment fluid that remains fluid for an extended period of time up until a specific point in which it undergoes a near immediate set, thus reducing concerns over the treatment fluid gelling or setting while operations are ongoing, for example, while drilling if the treatment fluid is being used as a drilling fluid. FIG. 7 provides an example of "right-angle" set profile using Sample B from Example 4.

The preceding description provides various embodiments of the systems and methods of use disclosed herein which may contain different method steps and alternative combinations of components. It should be understood that, although individual embodiments may be discussed herein, the present disclosure covers all combinations of the disclosed embodiments, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, and may be modified and practiced in different but equivalent manners apparent to those skilled in the art having the benefit of the teachings herein. Although individual embodiments are discussed, the disclosure covers all combinations of all of the embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of those embodiments. If there is any conflict in the usages of a word or term in this specification and one or more patent(s) or other documents that may be incorporated herein by reference, the definitions that are consistent with this specification should be adopted.

What is claimed is:

1. A system for treating a well comprising:
a treatment fluid comprising a suspension of about 40% to about 70% calcium-aluminate cement by weight of the treatment fluid, wherein the treatment fluid further comprises about 70% to about 200% water by weight of the calcium aluminate cement, about 0.01% to about 5% dispersant by weight of the calcium aluminate cement, and about 0.01% to about 10% cement set retarder by weight of the calcium aluminate cement, wherein the treatment fluid is capable of remaining in a pumpable fluid state for at least 7 days;
a vessel to contain the treatment fluid;
a pumping system coupled to the vessel to pump the treatment fluid;
a drilling system comprising a drill string, wherein the drilling system is configured for circulation of the treatment fluid therethrough while extending a wellbore through a subterranean formation using the drill string;
a conduit coupled to the pumping system; and
a treatment fluid recovery system for recovery of at least a portion of the treatment fluid from the wellbore, wherein the treatment fluid recovery system comprises a vessel to store and mix a cement set activator with the at least a portion of the treatment fluid to form an activated cement, and wherein the pumping system is further configured to pump the activated cement into the wellbore.

2. The system of claim 1 further comprising a storage system or storing the treatment fluid.

3. The system of claim 1 wherein the cement set retarder is selected from the group consisting of hydroxycarboxylic acids or their respective salts, boric acid or its respective salt, and any combination thereof.

4. The system of claim 1 wherein the treatment fluid further comprises a cement set activator is selected from the group consisting of Groups IA and IIA hydroxides; alkaline aluminates; Portland cement, and combinations thereof.

5. The system of claim 1 wherein the dispersant is selected from the group consisting of sulfonated-formaldehyde-based dispersant, a polycarboxylated ether dispersant, and any combination thereof.

6. The system of claim 1 wherein the treatment fluid further comprises a cement set accelerator selected from the group consisting of lithium sulfate, lithium carbonate, and any combination thereof.

7. The system of claim 1 wherein at least a portion of the treatment fluid is allowed to remain static in the wellbore.

8. The system of claim 1 wherein the treatment fluid forms a puddle in the bottom of the wellbore.

9. The system of claim 8 wherein the conduit is configured for placement into the puddle formed by the treatment fluid in the bottom of the wellbore.

10. A system for treating a well comprising:
a vessel containing a treatment fluid comprising:
a suspension of about 40% to about 70% calcium-aluminate cement by weight of the treatment fluid, about 70% to about 200% water by weight of the calcium aluminate cement, about 0.01% to about 5% dispersant by weight of the calcium aluminate cement, and about 0.01% to about 10% cement set retarder by weight of the calcium aluminate cement, wherein the treatment fluid is capable of remaining in a pumpable fluid state for at least 7 days to contain the treatment fluid;
a pumping system coupled to the vessel to pump the treatment fluid, wherein the pumping system is configured to pump the treatment fluid into a wellbore; and
a treatment fluid recovery system for recovery of at least a portion of the treatment fluid from the wellbore, wherein the treatment fluid recovery system comprises a vessel to store and mix a cement set activator with the at least a portion of the treatment fluid to form an activated cement, and wherein the pumping system is further configured to pump the activated cement into the wellbore.

11. The system of claim 10 wherein the cement set retarder is selected from the group consisting of hydroxy-carboxylic acids or their respective salts, boric acid or its respective salt, and any combination thereof.

12. The system of claim 10 wherein the cement set activator is selected from the group consisting of Groups IA and IIA hydroxides; alkaline aluminates; Portland cement, and combinations thereof.

13. The system of claim 10 wherein the dispersant is selected from the group consisting of sulfonated-formaldehyde-based dispersant, a polycarboxylated ether dispersant, and any combination thereof.

14. The system of claim 10 wherein at least a portion of the treatment fluid is allowed to remain static in the wellbore.

15. The system of claim 10 wherein the treatment fluid forms a puddle in the bottom of the wellbore.

16. The system of claim 10 further comprising a conduit coupled to the pumping system.

17. The system of claim 16 wherein the conduit is configured for placement into the puddle formed by the treatment fluid in the bottom of the wellbore.

18. The system of claim 10 further comprising a drilling system comprising a drill string.

19. The system of claim 18 wherein the drilling system is configured for circulation of the treatment fluid therethrough while extending a wellbore through a subterranean formation using the drill string.

* * * * *